Patented Nov. 13, 1951

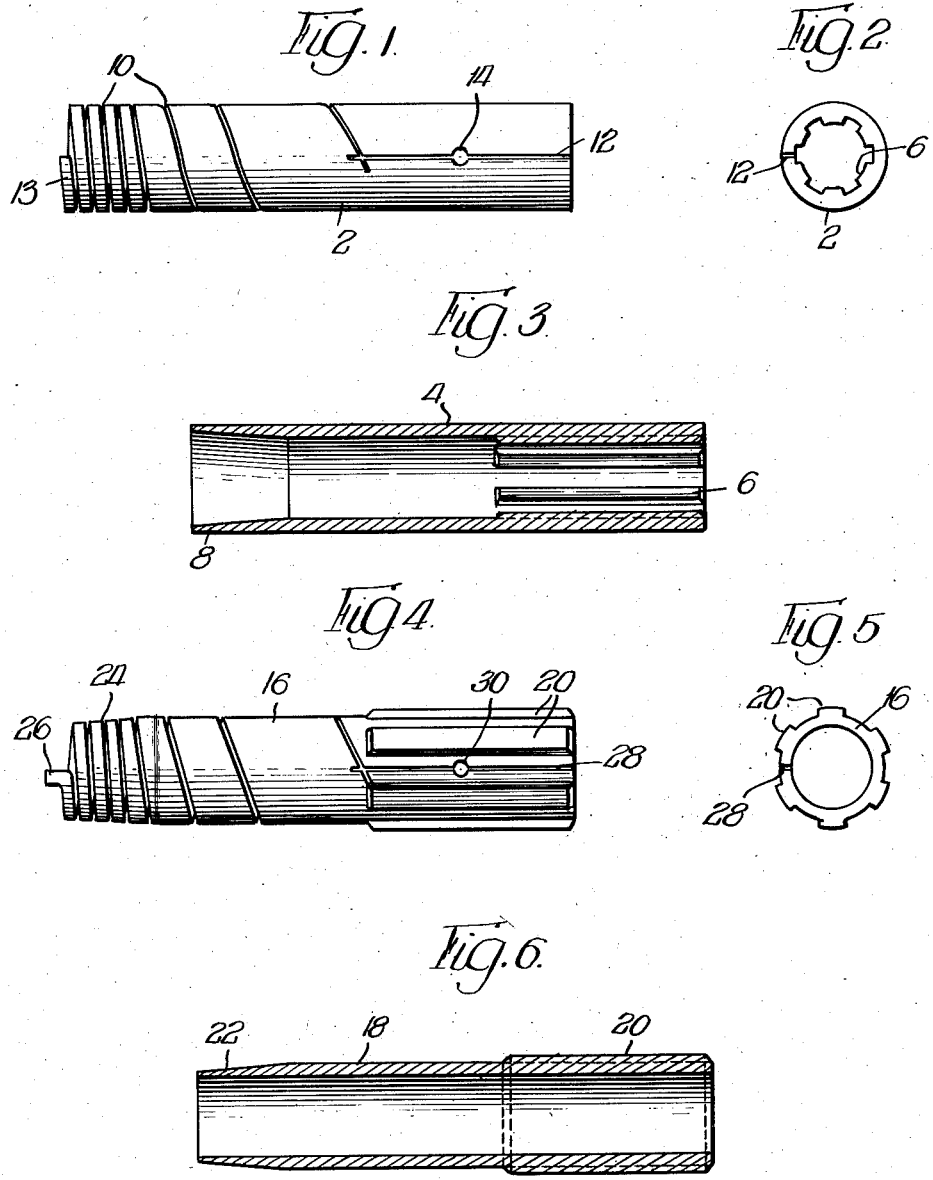

2,574,714

UNITED STATES PATENT OFFICE 2,574,714

METHOD OF FORMING A FLEXIBLE COIL CLUTCH

Thomas R. Smith, Newton, Iowa, assignor to The Maytag Company, Newton, Iowa, a corporation of Delaware Application December 3, 1948, Serial No. 63,362

2 Claims. (Cl. 29—152)

The present invention relates to friction clutch mechanisms, and more particularly to friction clutch elements of the coil type therefor and to methods of producing the same.

Among the objects of the invention is to provide a novel friction clutch element of the coil type which is characterized as having its adjacently disposed coils formed by slotting a hollow tubular member, the said slotting being effected at an angle of inclination to a plane normal to the longitudinal axis of the tubular member to provide a coil lead of the desired amount.

Another object of the present invention is to provide a novel friction clutch element of the coil type wherein the adjacently disposed coils thereof are formed by slotting a hollow tubular member, as by causing relative variable translatory movement and simultaneous angular turning movement between the tubular member and a tool, whereby the wall of said tubular member is cut to provide adjacently disposed coils varying in width in the direction of its longitudinal axis.

The invention further comprehends the idea of forming such a friction clutch element as defined above in which the tubular member is slotted from one end thereof to a point in spaced relation to the other end thereof to provide an anchoring end for securing the element in operative association with a drive or driven member of a friction clutch mechanism.

Another object of the present invention is to provide a friction clutch element having the characteristics as above set forth and which has the further advantage of being expansible or contractible throughout its entire length, including the anchoring end, by virtue of a longitudinal slot cut longitudinally through the wall of the anchoring end to intersect with the slot forming the coils, thus increasing the torque transmitting properties of the friction clutch element for any given length.

A further desideratum of the invention is to provide such friction clutch elements with novel anchoring means to prevent axial or longitudinal displacement of the same without affecting or lessening the expansibility or contractibility of the coils throughout the entire length of the element, including the anchoring end thereof.

The invention also embraces the idea of splining the tubular member which forms the anchoring end of the finished friction clutch element to assure a positive and effective driving relation between the same and a driving or driven member of a friction clutch mechanism, and also providing a tapered end portion opposite the anchoring end, whereby the coils formed at such end portion are sensitized to obtain a sensitive control of the friction clutch element at its pick-up end.

The invention also involves a novel method whereby a hollow tubular member is cut and milled, or otherwise shaped or formed, to provide a friction clutch element of the expansible or contractible coil type having the characteristics as hereinabove set forth.

Other objects, features, capabilities and advantages are comprehended by the invention, as will later appear and as are inherently possessed thereby.

Referring to the drawings:

Figure 1 is a view in side elevation of a friction clutch element of the expanding coil type made in accordance with the present invention;

Figure 2 is a view in end elevation of the spring clutch element shown in Figure 1 of the drawings;

Figure 3 is a longitudinal vertical cross-sectional view of a hollow tubular member from which the clutch element of Figure 1 is formed;

Figure 4 is a view in side elevation of the friction clutch element of the contracting coil type made in accordance with the present invention;

Figure 5 is a view in end elevation of the spring clutch element shown in Figure 4 of the drawings; and Figure 6 is a longitudinal vertical cross-sectional view of a hollow tubular member from which the clutch element of Figure 4 is formed.

Referring now more in detail to the drawings, two embodiments of the invention are disclosed, the same comprising clutch elements of the expanding and contracting coil type which are processed in accordance with the present invention from hollow tubular members.

More specifically, Figures 1 and 2 disclose a friction clutch element 2 of the expanding coil type formed from a hollow tubular member 4 which is initially processed, by machining or the like, to provide a series of splines 6 extending inwardly from one end thereof and which serve to connect said end of the coil formed therefrom in driving relation with a shaft, or the like. The hollow tubular member 4 has a uniform wall thickness with an inside diameter equal to the diameter at the base of the grooves forming the splines 6, except for the end opposite the splines 6 which is counterbored to provide a tapered wall section 8 for giving greater sensitivity to the pick-up end of the coil formed therefrom.

The hollow tubular member 4 is further processed by a cutting tool adapted to slot the same circumferentially in a longitudinal direction, as at 10, to provide adjacently disposed coil portions adapted to be expanded in a radial direction to effect a clutching relationship between the same and a driving or driven member of a clutch mechanism in the form of a sleeve, or the like. This slotting operation is effected by causing relative translatory and angular turning movement between the tool and the hollow tubular member 4. While the invention contemplates the formation of a clutch element in which the slot between adjacent or contiguous coils is disposed at a uniform angle of inclination with respect to a plane normal to the longitudinal axis of the coil, which provides adjacent coils with the same cross-sectional and bearing areas, nevertheless, the friction clutch element in its preferred form, as shown in the drawings, comprises a coil in which the spiral slot is formed on a variable helical angle whereby the width of the coils varies increasingly and progressively from the pick-up end of the coil, thereby forming a coil which is relatively sensitive at its pick-up end, but in which the coils have their cross-sectional and bearing areas increased as the load increases toward the anchoring end thereof.

As shown in Figure 1, after the tubular member has been slotted as at 10, the same is further slotted longitudinally by a suitable cutting tool, as at 12, to intersect with the slot 10 which terminates in spaced relation to the end of the tubular member which is splined. This provides a clutch element which can be expanded as a coil throughout its entire length into contacting relation with a driving or driven member in the form of a sleeve adapted to embrace the same. Expansion of the coil may be effected by any suitable means adapted to engage the pick-up end 13 thereof, whereby the coil is moved into frictional clutching relation to said driving or driven member. Intermediate the ends of the slot 12, the coil is provided with an enlarged opening or slot 14 communicating with the slot 12, which is adapted to receive a pin or the like for securing the splined end of the coil to a driving or driven member. It will be apparent that the opening or slot 14 provides opposed shoulders engageable with the pin to prevent lengthwise movement of the coil without interfering in any way with its expansibility.

In most clutch mechanisms, the driving member in the form of a shaft is connected to the splined end of the clutch element 2 and the driven member in the form of a sleeve embracing the clutch element carries a key, or the like, which may be moved into engagement with the pick-up end 13 of the clutch element to expand the same into frictional driving relation thereto. However, if it is so desired, the sleeve may constitute the driving member and the shaft the driven member.

Figures 4 and 5 of the drawings disclose a clutch element 16 of the contracting coil type which is formed from a hollow tubular member 18 in much the same manner as the coil 2 of the previously described embodiment is formed from the hollow tubular member 4. In this form of the invention the hollow tubular member has an opening of uniform diameter therethrough and the splines, as shown at 20, are formed on the outer cylindrical surface of the tubular member to provide means whereby the clutch element 6 may be connected to a driving or driven member in the form of a sleeve. The other end of the tubular member 18 has its outer surface tapered, as at 22, to sensitize the pick-up end of the clutch element, as in the previously described embodiment.

The hollow tubular member 18 is slotted, as at 24, in the same manner as the tubular member 4 in the previously described embodiment to provide adjacently disposed coils which are contractible about a shaft for transmitting torque between the shaft and the sleeve which embraces and is connected to the splined end thereof. The clutch element has its sensitized end bent outwardly and axially, as at 26, which is adapted to be engaged by suitable means for contracting the clutch element into torque transferring relation to the shaft embraced thereby. As in the previously described embodiment, the invention contemplates the provision of a slot or gap which will form adjacent coils of uniform width and cross-sectional area throughout the length of the clutch element, but in the preferred form of the invention as illustrated in Figures 4 and 5, the spiral slot 24 is formed on a variable helical angle so that the width of the coils progressively increases from the pick-up end 26 toward the other end of the clutch element. The clutch element of this embodiment is likewise slotted longitudinally at its splined end, as at 28, to intersect with the slot 24 so that the entire length of the same is contractible to effect a friction driving relation with the shaft embraced thereby. Furthermore, intermediate the ends of the slot 28 is another slot or opening 30 of a diameter greater than the width of the slot 28, which is adapted to receive a pin which interengages with the embracing sleeve to prevent longitudinal or lengthwise displacement of the clutch element 16 relative to the driving and driven members.

As will be clearly apparent, the method of forming the clutch element in accordance with the present disclosure results in a final product in which internal and external surfaces may be accurately controlled so as to provide effective and uniform bearing relation between the same and the driving or driven members with which the same is associated in a torque transmitting assembly. The particular method herein disclosed greatly facilitates the formation of a clutch element of the coil type herein contemplated in contra-distinction to previously known methods which involve the wrapping of a piece of stock about a central mandrel. It is further apparent that the particular means by which the coil is anchored and maintained in operative position has the distinct advantage of permitting the use of the entire available surface of the clutch element as a torque transmitting device, which leads to economies in the design of a coil of this type for transmitting loads of any given amount.

As in the illustrative embodiment shown in Figures 4 and 5 of the drawings, the driving member in the form of a sleeve is connected to the splined end of the clutch element 16 and the driven member in the form of a shaft is embraced by the same whereby torque is transmitted between the two when the pick-up end 26 is held to contract the clutch element into frictional engagement with the driven member. However, if it is so desired, the shaft may constitute the driving member and the sleeve the driven member.

Preferably, the clutch elements 2 and 16 of the embodiments herein disclosed are formed from flexible and resilient material to provide a clutch having the properties of a spring, although it is to be understood that the invention comprehends the use of material which is flexible but non-resilient.

While I have herein described and upon the drawings shown illustrative embodiments of the invention, it is to be understood that the invention is not limited thereto but may comprehend other constructions, arrangements of parts, details, features and process steps, without departing from the spirit of the invention.

It is claimed:

1. The method of forming a flexible coil type clutch having an energizing portion and a load transmitting portion, comprising the steps of reducing the wall thickness of a tubular member on the energizing portion leaving a shoulder on the load transmitting portion, forming a load transmitting spline in the shoulder, tapering the wall thickness of the energizing portion of said tubular member for a limited distance adjacent the energizing portion end, circumferentially slotting the wall of the tubular member on the energizing portion to form a spiral of adjacently disposed coils of varying widths with the narrowest coils adjacent the energizing portion end of said tubular member and the wider coils adjacent said spline, and longitudinally slotting the splined load transmitting portion of the tubular member between its outer end and said first named slot to permit radial contraction and expansion of the entire tubular member.

2. The method of forming a flexible coil type clutch having an energizing portion and a load transmitting portion, comprising the steps of reducing the wall thickness of a tubular member on the energizing portion leaving a shoulder on the load transmitting portion, forming a load transmitting spline in the shoulder, circumferentially slotting the wall of the tubular member on the energizing portion to form a spiral of adjacently disposed coils of varying widths with the narrowest coils adjacent the energizing portion end of said tubular member and the wider coils adjacent said spline, and longitudinally slotting the splined load transmitting portion of the tubular member between its outer end and said first named slot to permit radial contraction and expansion of the entire tubular member.

THOMAS R. SMITH.

REFERENCES CITED

The following references are of record in the file of this patent:

UNITED STATES PATENTS

| Number | Name | Date |
|---|---|---|
| 592,599 | Warwick | Oct. 26, 1897 |
| 1,043,423 | Hess | Nov. 5, 1912 |
| 1,126,780 | Jones | Feb. 2, 1915 |
| 1,553,515 | Dennison | Sept. 15, 1925 |
| 1,714,496 | Chilton | May 28, 1929 |
| 2,055,068 | Drexler | Sept. 22, 1936 |
| 2,070,892 | Gamble | Feb. 16, 1937 |
| 2,210,993 | Weatherhead, Jr. | Aug. 13, 1940 |
| 2,247,298 | Kattwinkel | June 24, 1941 |
| 2,248,969 | Darling | July 15, 1941 |
| 2,343,079 | Pickwell | Feb. 29, 1944 |
| 2,358,707 | Haas | Sept. 19, 1944 |
| 2,432,842 | Wellman | Dec. 16, 1947 |
| 2,480,783 | Sloan | Aug. 30, 1949 |